Figure 1:
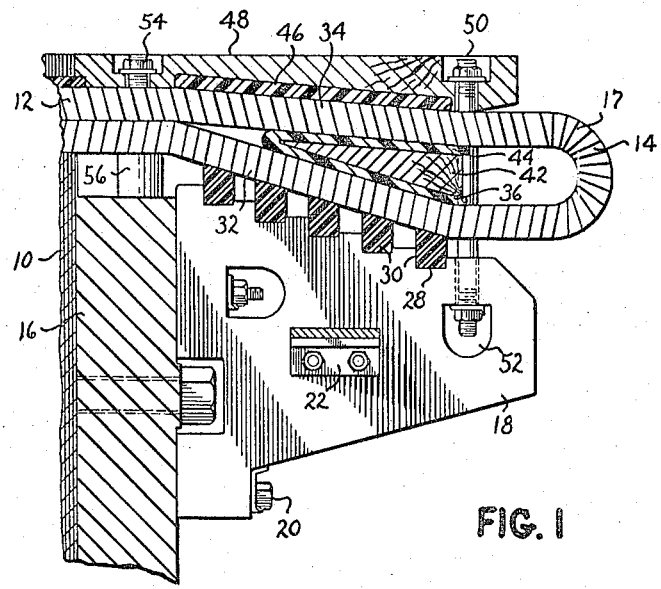

Dec. 20, 1966  R. W. STEVENS  3,293,472

END TURN SUPPORT ARRANGEMENT

Original Filed Jan. 2, 1962

INVENTOR.
ROBERT W. STEVENS
BY
ATTORNEY

United States Patent Office 3,293,472
Patented Dec. 20, 1966

3,293,472
END TURN SUPPORT ARRANGEMENT
Robert W. Stevens, 2065 Chepstow Road,
Schenectady, N.Y. 12303
Continuation of application Ser. No. 163,606, Jan. 2, 1962. This application Aug. 9, 1965, Ser. No. 478,241
5 Claims. (Cl. 310—260)

This application is a continuation of my earlier patent application Serial No. 163,606 filed January 2, 1962, now abandoned.

The invention described herein relates to dynamoelectric machines and particularly to a construction for bracing rotor and stator winding end turns against radial and circumferential displacement when the machine is operated under load conditions.

During starting and subsequent operation of a motor or generator subjected to varying loads, frequent heavy loads, short circuits, and the like, the magnitude of currents flowing in coils comprising the winding establishes magnetic fields of intensities sufficient to cause deflection of the coil end turns if they are not restrained against movement. Such end turn movement resulting from the magnetic and vibratory forces loosens the coil or bar conductors in the magnetic core slots, and also causes flexing of the ground insulation, the combined effect being that of establishing areas of low dielectric strength in the coil insulation. When chafing and/or subsequent failure of the insulation takes place, a path of low resistance is created for the flow of current between the coil and iron of the magnetic core slots. When short circuit conditions of this type occur, the likelihood of causing extensive damage to the machine is great.

To overcome these problems, prior art end turn bracing techniques for a stator winding for example, include tying individual spacers of wood or fabric re-inforced plastic between the sides of adjacent coil end turns for preventing displacement in a circumferential direction. Fabric re-inforced plastic stiffeners are located in the space between the layers of overlapped end turns for minimizing movement of the end turns radially. Outward movement is minimized by placing winding supports of steel or other material on the end turn outer peripheral surface. The principal disadvantage of this kind of bracing construction resides in the high labor costs involved in individually fitting and tying each spacer to the end turns. Also, on occasion, the spacing or tying material dries out, thus losing the tightness or rigidity imparted to the coils during the manufacturing operation. The adverse conditions resulting from coil end turn movement described above then occurs in varying degrees and sometimes requires remedial action.

The primary object of my invention therefore is to provide an end turn bracing design which eliminates the high manufacturing costs of the prior art constructions while simultaneously furnishing rigidity to the complete end turn system.

Still another object of my invention is to provide a construction wherein an initially flexible material is used for minimizing both radial and circumferential displacement of the end turns.

In carrying out my invention, I eliminate the need for securing the individual spacers and plastic stiffeners in place to restrict end turn movement by employing a stiffener of initial putty-like material adapted for positioning between the overlapping layers of end turns during the manufacturing operation. Since the putty-like material is of an initially viscous form, it conforms under pressure to the end turn surfaces so that upon curing, the putty becomes hard and inflexible thus locking the end turns in the same set position as that assumed when first placed in the magnetic core slots. A band of similar material is disposed around the outer peripheral surface of the end turns for restricting outward movement during machine operation.

Figure 2:
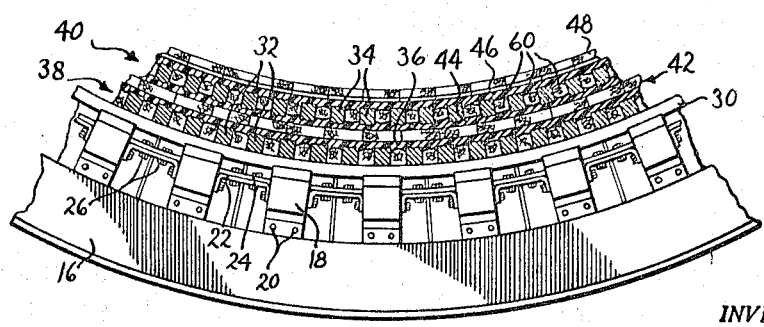

While the specification concludes with claims particularly pointing out and distinctly claiming the subject matter which I regard as my invention, it is believed the invention will be better understood from the following description taken in connection with the accompanying drawing in which:

FIGURE 1 is a view in elevation, partly in section, illustrating the disposition of the bracing devices in and around the coil end turns of a motor; and FIGURE 2 is an end view, partly in section, of the construction shown in FIGURE 1.

Referring now to the drawings wherein like reference characters designate like or corresponding parts throughout the several views, there is shown an end of a magnetic core including laminations 10 comprising a stator for a motor. A multitude of coils 12 including end turns 14 are placed in slots formed in the laminations and constitutes the stator winding for the machine. An end ring 16 holds the laminations 10 under pressure in the usual manner. Although the construction disclosed herein has application to all types of dynamo-electric machines and transformers, the particular embodiment shown for illustrating the invention consists of a stator for a large generator, but it will be understood that the inventive teachings have application to other types and sizes of magnetic cores having windings subject to displacement when placed in the core and energized.

The coils of the winding shown consist of stranded conductors of rectangular cross section equipped with ground insulation 17 and include the end turn portions with the appropriate connections made outside the machine. In order to restrict the heavy end turns against inward displacement when the winding is energized, a multitude of laminated wood or fiber re-inforced plastic blocks 18 for example, are spaced circumferentially around the motor frame and rigidly secured to the ring 16 by bolts 20. These laminated blocks are joined with each other by a pair of U-shaped plates 22 and an insulating block 24, both being held together by bolts 26.

Prior to installing the wooden blocks 18 in position, several grooves 28 are cut in the block surface which faces the coil end turns. The grooves preferably are of square configuration, but may be rounded, to accept closed rings 30 which extend completely around the stator frame. It will be noted that shoulders in the groove walls effectively prevent movement of the rings after all the blocks have been bolted into position. Also, the rings are beveled to an angle complementary to the outer sides of the coil end turns thereby providing a solid base on which the end turns may rest. As described hereafter, the end turns are intentionally drawn into firm engagement with the rings during one of the last steps in the manufacturing process.

The rings 30 preferably are made of non-conductive material, such as re-inforced plastic not only for minimizing machine losses which would occur if made of metal, but also, for eliminating the possibility of short circuits to ground if a fault occurred in the end turn insulation. Nevertheless, a ring of metal could be used if it were equipped with insulation of sufficient quality to assure against the development of short circuits if chafing of the end turn insulation took place. The disposition of the multitude of coil end turns with respect to the rings and how the wooden blocks 18 support the rings is clearly shown in FIGURE 2. It will be apparent that the combined structure of rings 30 and wooden blocks 18 will prevent any movement of the end turns outwardly when subjected to magnetic and vibratory forces.

However, the end turns still may move circumferentially and inwardly. To restrict such movement, a thick sheet of insulating material 36 of putty-like consistency is laid on the inner surface of the outer layer of end turns as the bar conductors of the coils are being placed in their slots.

The bar conductors or coil sides are designed in such manner that the diagonal portion 32 of each outer coil end turn is bent away from the slot axis in one direction while the inner end turn 34 is similarly turned in the opposite direction. According to well known practices, during assembly, the bar conductors are placed in the core slots in a predetermined manner and when the end turn connections are made, the construction presented consists of two layers of concentrically disposed end turns generally indicated as 38 and 40 in FIGURE 2, having a space therebetween. As the bar conductors are being placed in the slots, the sheet of insulating material is laid on the inner surface of the outer layer of end turns and serves to substantially fill the space between the layers 38 and 40. Because the space between the end turn layers progressively increases outward from the coil, individual spacers 42 of wood are positioned at spaced distances circumferentially on the insulating material 36. An additional layer of the same material 44 is placed over the wood spacers. When the inner coil sides or bar conductors are positioned in the slots, the end turns 34 thereof compresses the insulating material, thus causing it to deform around the end turn surfaces with which it is in contact. Reference to FIGURE 2 will show that it is squeezed over the ends of each coil end turn and such disposition of the material is readily evident in machines constructed in accordance with this invention. As discussed hereafter, the material retains this same configuration after the manufacturing operation is complete.

When all of the coils are in place, an additional layer 46 of the same insulating material is wrapped around the inner layer of end turns 34 and blocks 48 and beveled as shown, are located on the material. Each of blocks 48 are equipped with countersunk holes for receiving bolts 50 which terminate in openings 52 formed in the wooden supports 18. A similar bored hole is provided in the other end of the blocks for bolts 54 which are anchored in the ring 16. As shown, spacers 56 enclose the bolt and support the inner portions of the end turns where they exit from the slots.

When these parts are completely assembled, the bolts 50 and 54 are taken up in a symmetrical manner around the core to compress the layers of insulation 36, 44 and 46 into intimate contact with the exposed end turn surfaces. In doing so, the material is squeezed over the sides of the end turns as illustrated in FIGURE 2.

The putty-like material 36, 44 and 46 is commercially available under the trademark Glaskyd and consists of a polyester resin re-inforced with chopped glass and an inorganic filler, such as talc or silica, and a catalyst. Upon completion of the assembly operation, the machine is placed in an oven and heated to approximately 80° C. at which temperature the peroxide catalyst causes the resin to cure or set to a hard rigid mass. Upon doing so, the putty-like material retains its original shape and conforms closely to the exposed end turn surfaces.

My objective of providing a construction which restricts end turn movement to the point where the previous problems associated therewith are eliminated, is completely fulfilled by the invention. Circumferential displacement of both the inner and outer end turns is prevented by small portions of insulation which have been compressed over the sides of the end turns with which the insulation is in contact. The insulating material sets to a hard inflexible substance and since it is in intimate contact with the end turn surfaces, circumferential end turn movement is restrained to the point as to not constitute a problem.

In some cases where the currents expected to be encountered during machine operation reach high magnitudes, spacers 60 may be placed between adjacent coil sides as shown in FIGURE 2, and then secured thereto by conventional binding means. The putty-like material also could be used for this purpose since it conforms readily to the end turn surfaces. Obviously, materials having similar characteristics could be employed, such as fiber re-inforced plastics.

Radial displacement of the end turns is restricted by the bands or layers 36, 44 and 46. As previously mentioned when the insulating material sets, it becomes inflexible and its resistance to deformation from radial imposed end turns stress is so great that the end turns are held to a substantially immovable position when subjected to magnetic and vibratory forces.

The benefits derived from this construction are that the material easily can be assembled and installed at the relatively low cost. It eliminates the requirement for use of individual spacers and stiffeners which previously were laboriously fitted and tied to the end turns. The putty-like material therefore serves the dual function of preventing end turn displacement in both a radial and circumferential direction. Because of the close conformity of the insulation 36, 44 and 46 to the end turn surfaces, the stresses which the end turns will impart to the insulation during operation are more uniformly distributed, thereby providing an end turn structure which precludes damage to the ground insulation as a result of end turn movement.

Although the above disclosure has been directed toward a generator stator core for illustrating the teachings of the invention, it will be apparent that they are equally applicable to a rotor. The end turns therein are subjected to substantially the same forces, in addition to centrifugal forces, and they therefore could be restricted in much the same manner as that disclosed above. Conventional binding bands of steel or resin treated glass tape could be applied around the outer peripheral surfaces of the end turns for restricting their outward displacement, in the same manner and that carried out by present processes. The teachings apply also to random wound machines of relatively small sizes, particularly those where forces act to cause end turn displacement.

In view of the above it will be apparent that many modifications and variations are possible in light of the above teachings. It therefore is to be understood that within the scope of the appended claims the invention may be practiced other than as specifically described.

What I claim as new and desire to secure by Letters Patent of the United States is:

1. In a dynamoelectric machine having a laminated core with a plurality of axially extending circumferentially spaced slots therein, and a winding in said core including a plurality of coils in said slots having inner and outer overlapping layers of end turns projecting axially outward from the core, the improvement of an end turn support system comprising:

(a) a pad of insulating material in a substantially inflexible state disposed between the overlapping layers of end turns and positioned in intimate contact with and conforming to the facing surfaces of adjacent end turns in both the inner and outer layers, the material of said pad being characterized by an initially viscous form permanently curable to said substantially inflexible state; and (b) means separate from said pad rigidly secured to said core and essentially immovable relative thereto biased against the inner surface of said inner layer and the outer surface of said outer layer providing constriction of said layers toward each other, (c) whereby said pad and said means combine to render said end turns substantially immovable relative to said core when the winding is subjected to magnetic and vibratory forces.

2. The apparatus of claim 1 wherein said pad extends along a major portion of the length of said end turns and provides a continuous ring disposed between said layers.

3. The apparatus of claim 1 wherein said pad comprises inner and outer portions of said material and a solid filler is sandwiched between said portions, said inner and outer portions contacting the facing surfaces of said inner and outer layers, respectively.

4. The apparatus of claim 1 wherein said means comprises a plurality of circumferentially spaced blocks immovably mounted relative to said core and a plurality of axially spaced rings of successively varying diameter carried by said blocks, said rings being positioned between said blocks and said outer layer and in contact with the outer end turn surfaces of said outer layer.

5. The apparatus of claim 4 wherein said means further comprises bracing members rigidly connected to the core and essentially immovable relative thereto contacting the inner surface of said inner layer of end turns, said bracing members being connected at their axially outward end to said blocks by means biasing said members and said blocks toward each other.

References Cited by the Examiner

UNITED STATES PATENTS

| 2,714,675 | 8/1955 | Heidbreder | 310—271 X |
| 2,848,634 | 8/1958 | Decaudaveine | 310—260 |
| 2,961,555 | 11/1960 | Towne | 310—260 X |
| 3,123,729 | 3/1963 | Fogel | 310—260 |

FOREIGN PATENTS 761,181  3/1954  Germany.

MILTON O. HIRSHFIELD, *Primary Examiner.*

J. SWARTZ, *Assistant Examiner.*